Oct. 16, 1962  J. A. MARLAND  3,058,556
TRANSMISSION
Filed Feb. 14, 1958  3 Sheets-Sheet 1
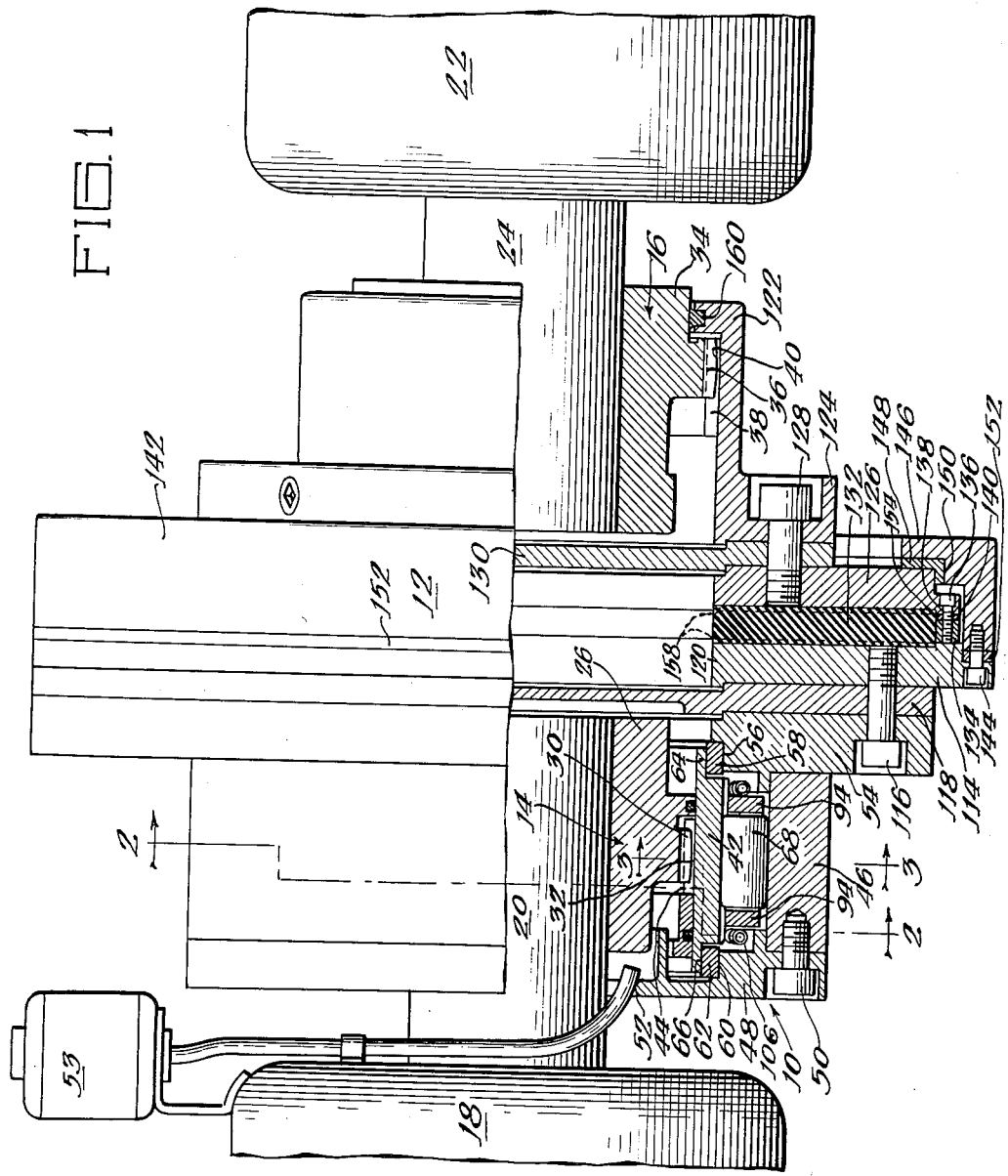
Inventor:
Joseph A. Marland
By: Graf, Wierman &
Burmeister
Attorneys

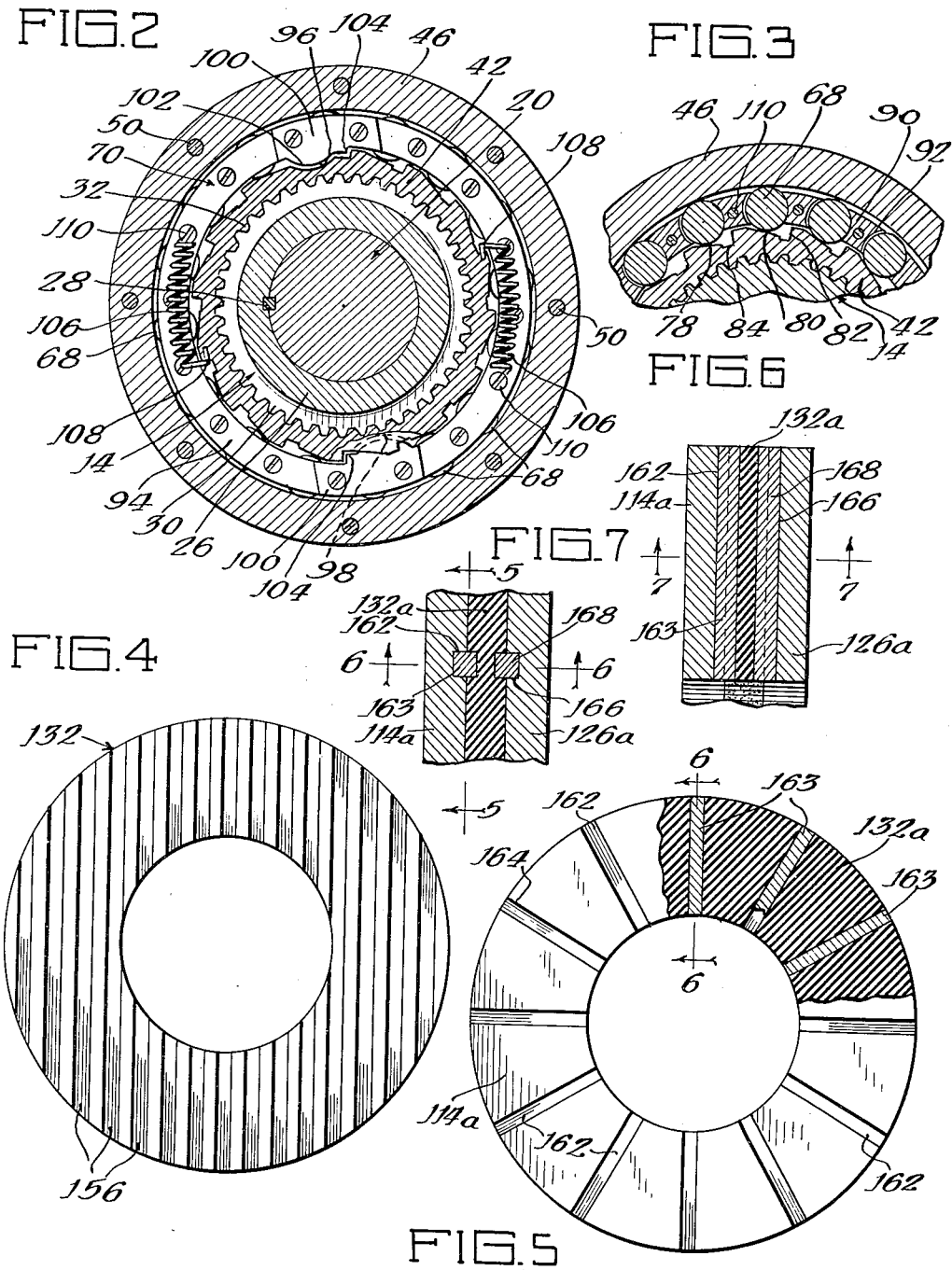

Oct. 16, 1962 J. A. MARLAND 3,058,556
TRANSMISSION
Filed Feb. 14, 1958 3 Sheets-Sheet 3

Inventor:
Joseph A. Marland
By Graf, Nieman & Burmeister
Attorneys

United States Patent Office 3,058,556
Patented Oct. 16, 1962

3,058,556
TRANSMISSION
Joseph A. Marland, 210 Blackstone, La Grange, Ill.
Filed Feb. 14, 1958, Ser. No. 715,437
10 Claims. (Cl. 192—45)

The present invention relates to transmissions, and more particularly to one-way transmissions.

It is often desirable to couple a machine to a prime mover through a one-way transmission. With such a system, the machine will not be operated unless the rotational torque applied by the prime mover is in the preferred direction. One obvious use of a one-way transmission is to couple two prime movers to a common machine, only one of the prime movers being employed to drive the machine at a particular time. The one-way transmission between the operating prime mover and the machine then transmits power, and the one-way transmission between the non-operating prime mover and the machine free wheels.

One-way clutches suitable for use in such transmissions are conventionally either of the roller or sprag type. In both types, driving elements are disposed between coaxially mounted inner and outer races, and the driving elements become wedged between the races when torque is applied in one direction and disengage when torque is applied in the other direction. In the sprag type of clutch, the driving elements are of non-cylindrical form, and the inner and outer races are cylindrical. In the roller type of clutch, either the inner or outer race is provided with indentations forming inclined planes, and the rollers rotate in these indentations, becoming wedged between the races for rotational torques in the driving direction.

One-way clutches of these types have experienced slippage in transmitting torque of rapidly varying magnitudes. The vibrance introduced by a reciprocating internal combustion engine or a reciprocating compressor substantially increases the wear on such one-way clutches, in addition to producing slippage. It is one of the objects of the present invention to provide a one-way transmission employing a roller or sprag clutch which is suitable for use with non-uniform torques.

The inventor achieves this object of his invention by providing a one-way clutch with a resilient coupler. It is a further object of the present invention to provide a resilient coupler particularly suitable for use in combination with a one-way clutch.

A source of wear for both resilient couplers and one-way clutches is misalignment of the driving and driven shafts to which the coupler is mounted. Misalignment of these shafts produces strains both upon couplers and upon one-way clutches. It is, therefore, a further object of the present invention to provide transmissions for rotational power with means for compensating for misalignment of the driving and driven shafts.

These objects of the invention and further objects will be more thoroughly understood from a further reading of this disclosure, particularly when viewed in the light of the drawings, in which:

FIGURE 1 is a view of a one-way transmission constructed according to the teachings of the present invention shown partly in section and partly in elevation;

FIGURE 2 is a sectional view taken along the line 2—2 of FIGURE 1;

FIGURE 3 is a fragmentary sectional view taken along the line 3—3 of FIGURE 1;

FIGURE 4 is an elevational view of a resilient coupling element for the coupler illustrated in FIGURE 1;

FIGURE 5 illustrates in section a modified flexible coupler;

FIGURE 6 is a sectional view taken along the line 6—6 of FIGURE 5;

FIGURE 7 is a sectional view taken along the line 7—7 of FIGURE 6;

Figure 8:
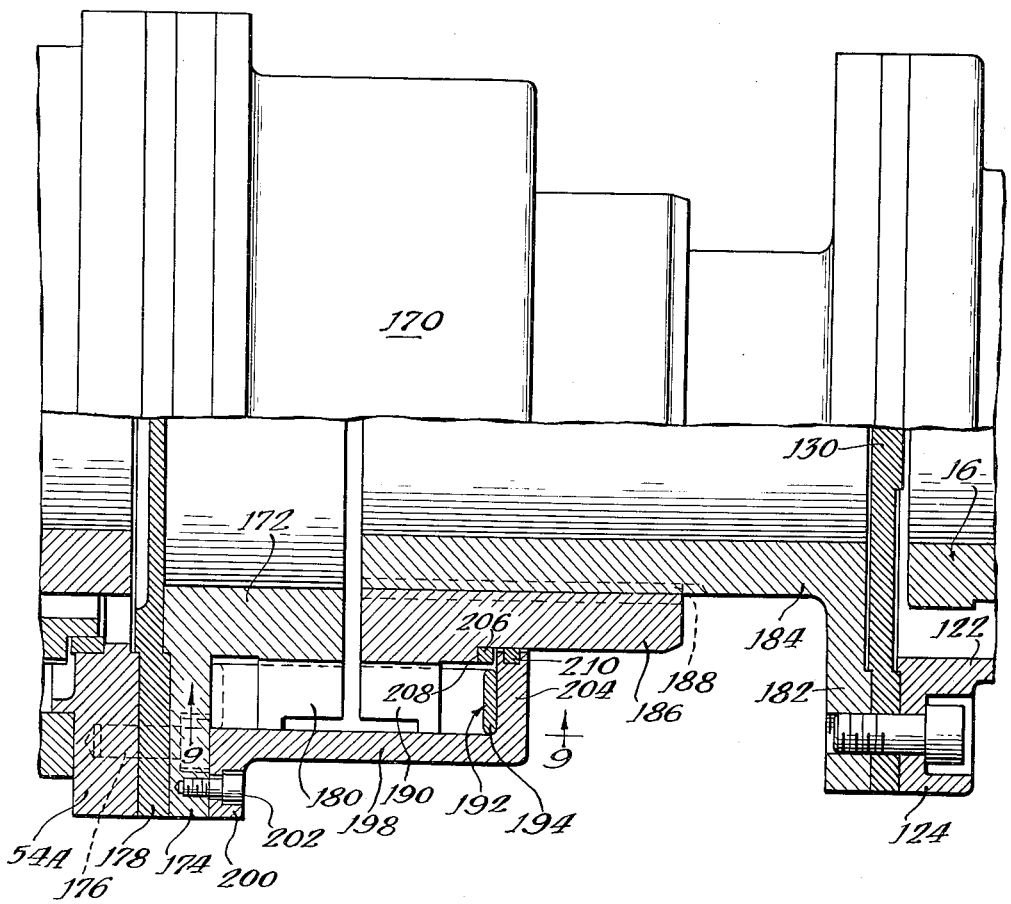
FIGURE 8 is a view illustrating another embodiment of the present invention partly in section and partly in elevation.

FIGURE 1 illustrates a one-way transmission with a clutch assembly 10, a flexible coupler 12 and shaft misalignment compensating means 14 and 16 coupled to the clutch assembly 10 and flexible coupling assembly 12, respectively. The clutch assembly 10 is coupled through the shaft alignment compensating means 14 to a driving machine 18 through a shaft 20, and a driven machine 22 is coupled to the shaft alignment compensating means 16 through a shaft 24. The shaft alignment compensation means 14 employs a sleeve 26, as indicated in FIGURES 1 and 2, which is secured to the shaft 20 and maintained in rotational position by a key 28 disposed between the shaft 20 and the sleeve 26. The periphery of the sleeve 26 is provided with outwardly extending gear teeth 30, and the gear teeth 30 are provided with a curved outer edge 32, the edge 32 curving toward the axis of the sleeve 26. The teeth 30 engage the clutch assembly 10.

The shaft misalignment compensation means 16 is similar in construction to the misalignment compensation means 14. It employs a sleeve 34 which is secured to the shaft 24, and has outwardly extending teeth 36 which engage the teeth 38 of the flexible coupler 12. The teeth 38 are straight teeth and extend along the axis of the sleeve 34. The teeth 36 have an edge 40 which curves at its ends toward the axis of the sleeve 34. As a result, misalignment of the shafts 20 and 24 will merely result in a slight tilting of the sleeves 26 and 34 relative to the clutch assembly 10 and the teeth 38 of the resilient coupler 12, and the misalignment of the shafts 20 and 24 will not result in unequal distribution of forces across the resilient coupler 12 or the one-way clutch assembly 10.

The clutch assembly 10 has a cylindrical inner race 42 which is provided with teeth 44 on its inner surface which are meshed with the teeth 30 of the sleeve 26. The inner race 42 is rotatably disposed within a cylindrical outer race 46, the outer race 46 forming a portion of the housing of the one-way transmission. A flat ring-shaped cover plate 48 is secured to the edge of the outer race 46 by bolts 50 extending around the cover plate 48, and the cover plate 48 extends close to the shaft 20 leaving an annular opening 52 for the introduction of oil from an oiler 53. A flat ring 54 with a smaller inner diameter and larger outer diameter than the outer race 46 is secured normal to the outer race on the side thereof opposite the cover plate 48. The inner surface of the ring 54 is provided with a flat cylindrical surface 56 which engages a cylindrical bushing 58 with a generally rectangular cross-section. The cover plate 48 is also provided with a cylindrical surface 60 aligned with the shoulder 56, and a cylindrical bushing 62 similar to the bushing 58 is mounted on the surface 60. The inner race 42 has flat cylindrical extensions 64 and 66 which abut the bushings 58 and 62, respectively. The edges of the inner race 42 also abut the edges of the bushings 58 and 62, so that the bushings maintain alignment of the inner race.

In this embodiment of the invention, the drive elements or clutch wedges are in the form of roller bearings 68. The roller bearings 68 are mounted in an assembly 70, as illustrated in FIGURES 1, 2 and 3. The inner race 42 is provided with a plurality of indentations 78 which have two flat surfaces, a leading surface 80 and a trailing surface 82 which is disposed essentially at a right angle relative to the leading surface 80. The leading surface 80 of each indentation 78 is disposed at an angle less than 15 degrees relative to the tangential plane at the intersection of the outer surface of the inner race 42 and the leading surface 80 of the indentation 78. Each of the indentations 78 is also provided with a groove 84 extending across the leading surface 80 of the indentation 78 immediately adjacent to the trailing surface 82 thereof for the purpose of permitting free flow of oil.

One of the bearings 68 is disposed between each indentation 78 of the inner race 42 and the outer race 46. The roller bearings 68 have a diameter larger than the distance between the outer surface of the inner race 42 and the inner surface of the outer race 46, and smaller than the distance between the leading surface 80 of the indentations 78 of the inner race 42 at a distance from the trailing surface 82 of the indentation approximately equal to the radius of the roller bearing to the inner surface of the outer race 46. In this manner, the roller bearings 68 are free to rotate when disposed adjacent to the trailing surface 82 of the indentations 78, but wedge between the inner race 42 and outer race 46 when rolling away from trailing surface 82 of the indentations of the inner race 42.

In the assembly 70, each of the roller bearings 68 is separated from adjacent roller bearings by a cage member 90 which has partially cylindrical surfaces 92 confronting each of the adjacent roller bearings 68 and which conform to the roller bearings. Also, each of the cage members 90 is interconnected at its ends by end rings 94, the end rings 94 and cage members 90 maintaining each of the roller bearings 68 in proper position relative to the inner race 42. The cage members 90 and end rings 94 form a cage for each of the roller bearings 68, so that the roller bearings 68 are free to move a small distance along radial planes since only the concave surfaces 94 of the cage members 90 retain them in position.

The inner race 42 is provided with two pairs of parallel slots 96 and 98. These slots 96 and 98 are disposed parallel to each other in the same indentation 78, respectively, on opposite sides of the outer surface of the inner race 42 normal to the axis of the inner race 42. Also, the slots 96 are disposed in indentations 78 on opposite sides of the axis of the inner race 42 from the slots 98. A stop lug 100 is secured to the roller bearing assembly 70 confronting each of the slots 96 and 98, and the stop lug 100 is provided with an inwardly protruding portion 102 which is slidably accommodated within the slots 96 or 98. In addition, each stop lug 100 is provided with an inwardly protruding tooth 104 which is adapted to abut the trailing edge of the indentation carrying the slot 96 or 98. The slots 96 are thus disposed adjacent to the end rings 94 of the roller bearing assembly 70 at opposite ends of the same roller bearing 68, and the slots 98 are likewise disposed adjacent to the end rings 94 of the same roller bearing 68.

The stop lugs 100 have two functions. When the clutch is operated in the direction of rotation, the teeth 104 of the stop lugs 100 abut the trailing surface 82 of the indentation 78 to limit the distance by which the roller bearings 68 may travel down the inclined planes or leading surfaces of the indentation 78, thus preventing the roller bearings 68 from abutting the trailing surfaces 82 of the indentation 78. In this manner, friction between the trailing surfaces of the indentations and the roller bearings 68 is substantially reduced. Also, since the protruding portions 102 of the stop lugs 100 are disposed within the slots 96, axial motion of the roller bearing assembly 70 relative to the inner race 42 is eliminated, thus assuring alignment of the roller bearing assembly 70 and the inner race 42. Since the roller bearing assembly 70 is in essence keyed to the inner race 42, the only necessary contact between the roller bearing assembly 70 and the outer race 46 is through the roller bearings 68. Hence, friction between the inner and outer races in the direction of rotation is minimized.

A pair of coil springs 106 are disposed on opposite sides of the axis of the inner race 42 on each side thereof to spring bias the roller bearing assembly 70 relative to the inner race 42 toward the locking position in order to insure engagement of the roller bearings 68 between the leading surfaces 80 of the indentations 78 and the outer race 46 when the clutch is in the rest position. The coil springs 106 have one end anchored within a bore 108 in the trailing surface 82 of indentations 78 on opposite sides of the axis of the inner race. The other end of the coil springs 106 is secured about a bolt 110 which is secured to the roller bearing assembly 70. The coil springs 106 form means to bias the rollers toward the intersection of the leading surface 80 and the outer surface of the inner race, and as a result, the "play" between the rest position of the clutch and the lock position of the clutch is greatly reduced.

While the end rings 94 may be secured to the roller cages 90 in any conventional manner, the applicant has found that a simple and very suitable way to accomplish this is to employ the bolts 110 for this purpose. The bolts 110 extend through the end rings 94, the cage members 90, and are anchored in the end rings 94. In like manner, the bolts 110 may be employed to secure the stop lugs 100 to the roller bearing assembly 70.

The flexible coupler 12 has an annular plate 114 with a larger outer diameter than the ring 54, and the plate 114 is secured to the ring 54, by bolts 116. A gasket 118 which is annular in shape, is disposed between the plate 114 and ring 54. The plate 114 has an axial opening 120 of approximately the same diameter as the inner diameter of the ring 54.

The teeth 38 of the misalignment compensation means 60 are disposed on the inner surface of a hollow hub 122, and the hub 122 has an outwardly extending flange 124 confronting the flexible coupling 12. A plate shaped ring 216 is secured to the flange 124 by bolts 128 disposed about the periphery of the hub 122, and the ring 126 confronts the plate 114. A gasket 130 is disposed between the flange 124 and the ring 126. A resilient disc 132 is clamped between the ring 126 and the plate 114.

The disc 132 is circular in form and of smaller outer diameter than the ring 126. Also, the ring 126 is of smaller outer diameter than the plate 114. A ring shaped spacer member 134 of rectangular cross-section is disposed about the disc 132 between the plate 114 and the ring 126, and a plurality of bolts 136 extend through bores 138 in the ring 126 and are anchored in a threaded bore 140 within the spacer 134.

In its free state, the disc 132 has a substantially greater thickness than the spacing between the ring 126 in the plate 114. A compression member 142 which is secured to the periphery of the plate 114 by bolts 144, however, compresses the disc 132 to the same thickness as the spacer 134. The compression member is annular in form and has an inwardly extending flange 146 which exerts force on a bushing 148 disposed between the flange 146 and the ring 126, thereby compressing the disc 132. The compression member 142 has a cylindrical shoulder 150 which confronts the edge of the ring 126, and the bushing 148, which is generally cylindrical in form, has an L-shaped cross-section and is disposed both between the shoulder 150 of the member 142 and the flange 146 of the member 142 and the ring 126, as illustrated in FIGURE 1. Shims 152 may be disposed between the compression member 142 and the plate 114, and shims 154 may be disposed between the spacer 134 and the ring 126. By inserting wider shims, the compression on the disc 132 may be reduced thus changing the frequency of mechanical resonance of the flexible coupler 12.

The inventor has found that it is desirable to have maximum friction between the plate 114 and the resilient disc 132, and also between the disc 132 and the ring 126. To accomplish this, the resilient disc 132 is provided with parallel spaced grooves 156 on both of its flat surfaces, these grooves 156 being rectangular in cross-section. Also, rectangular protruding ribs 158 extend outwardly from the plate 114 and ring 126, and the ribs 158 are accommodated within the grooves 156. The disc 132 is constructed of resilient material such as latex or synthetic rubber.

The gear teeth 36 and 38 in the shaft misalignment compensating means 16 are lubricated by a relatively viscous lubricant packed in the space between the hub 122 and the sleeve 34. A retaining ring 160 disposed between the outer extremity of the hub 122 and the sleeve 34 prevents escape of the lubricant from this interface, and the gasket 130 disposed between the flexible coupler and the shaft misalignment compensating means 16 prevents escape of the lubricant through that interface. Since there are no moving parts in the flexible coupler 12, it is not necessary to provide additional lubrication. The one-way clutch assembly 10, however, is lubricated by an oil of relatively low viscosity.

FIGURES 5, 6 and 7 illustrate a modification of the one-way transmission illustrated in FIGURE 1. In this modification, the plate 114A replaces plate 114 and is provided with radial grooves 162, and strips 163 extend outwardly from the radial grooves 162 to fit within indentations 164 disposed along radii of a resilient disc 132A. In like manner, a ring 126A similar to the ring 126 is provided with grooves 166 disposed on radii thereof, and plates 168 extend outwardly from the ring 126A to fit within indentations in the resilient disc 132A.

Figure 9:
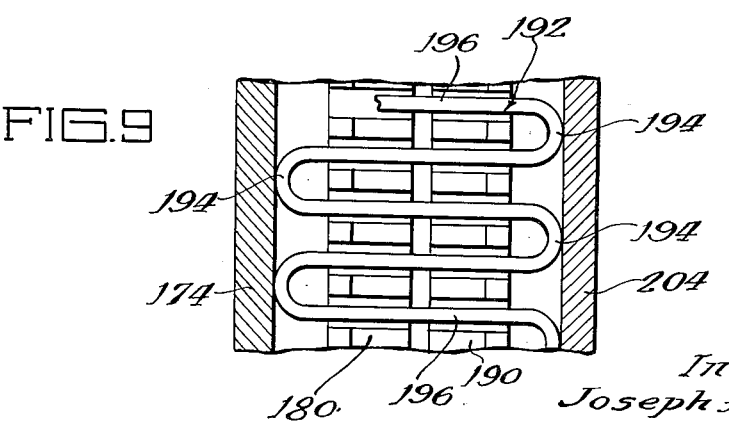
FIGURE 9 is a sectional view taken along the line 9—9 of FIGURE 8.

FIGURES 8 and 9 illustrate another modification of the present invention. In these views, the clutch assembly 10 is identical to that illustrated in FIGURES 1 through 3, but the resilient coupler is of different construction than the resilient couplers previously disclosed. In this embodiment of the invention, the ring 54A corresponds to the ring 54 of FIGURE 1, and is similar thereto except it has a smaller diameter than the ring 54. The flexible coupler, designated 170, has a cylindrical hub 172 with an outwardly extending flange 174 which is secured to the ring 54A by bolts 176. A gasket 178 is disposed between the flange 174 and the ring 54A.

The hub 172 has a plurality of spaced outwardly extending serrations 180 about its outer periphery, these serrations 180 also being spaced from the flange 174. The outwardly extending flange 124 of the hub 122 of the shaft misalignment compensation means 16 is secured to an outwardly extending flange 182 of a cylindrical sleeve 184. The gasket 130 is disposed between the flanges 124 and 182. The sleeve 184 extends toward the hub 172, and the end of the sleeve 184 is spaced therefrom. A cylinder 186 is secured to the sleeve 184 and prevented from rotating therewith by a key 188. The cylinder 186 has the same diameter as the hub 172 and is disposed in contact with the outer surface of the sleeve 184. The cylinder 186 is spaced from the end of the hub 172. A plurality of serrations 190, equal in number to the serrations 180, are disposed above the periphery of the cylinder 186 parallel to its axis. A serpentine spring 192 having right angle turned portions 194 and straight central portions 196 is wound between the serrations 180 and 190, the serrations being aligned in pairs between straight portions 196 of the spring 192, as best illustrated in FIGURE 9. A cover 198, which is angular in cross-section, is disposed about the serrations 180 and 190 and the spring 192. The cover 198 has an outwardly extending flange 200 which is secured to the flange 174 of the hub 172 by bolts 202. The other end of the cover 198 has an inwardly extending ring portion 204 which abuts the cylinder 186, and a ring shaped thrust bearing 206 is disposed adjacent to an annular shoulder 208 in the cylinder 186 and abuts the ring portion 204 of the cover 198. A flexible sealing ring 210 of rectangular cross-section is disposed between the inner periphery of the ring portion 204 of the cover 198 and the cylinder 186.

In this flexible coupler 170, torque is transmitted from the hub to the cylinder 186 through the serrations 180 and 190 and the spring 192. As variations in torque occur, the spring 192 damps out these variations and transmits a relatively constant torque.

From the foregoing disclosure, it is apparent that the inventor has disclosed a one-way transmission with a free wheeling clutch which is suitable for use to transmit power in a torsionally vibrant mechanical power circuit, whether the vibration is introduced by the power source, such as an internal combustion engine, or by the load, such as a reciprocating fluid compressor. As a result of employing the combination of a one-way clutch with drive elements between the inner and outer race thereof and a flexible coupler, slippage of the clutch resulting from variations in torque transmission is substantially eliminated. Further, as a result of the combination of shaft misalignment compensating means and the flexible coupler, the flexible coupler does not compensate for shaft misalignment reducing wear in the flexible coupler and substantially prolonging its life. As a result of the combination of shaft misalignment compensating means and a one-way clutch employing wedges between the inner and outer races thereof, wear has been substantially reduced in the one-way clutch.

Those skilled in the art will readily perceive many additional advantages of the present invention. Further, many additional applications of the present invention will become apparent from a reading of this disclosure. It is, therefore, intended that the scope of the present invention be not limited by the foregoing disclosure, but rather only by the appended claims.

The invention claimed is:

1. A one-way transmission comprising a generally cylindrical inner race, a generally cylindrical outer race disposed coaxially about the inner race, a plurality of drive elements disposed between the inner race and the outer race, rotational torque applied between the inner and outer races in one direction wedging the drive elements between the races and torque in the other direction releasing the drive elements, a coupled having a first member connected to one of the races and a second member coupled to the first member, a compliant member disposed between the first and second members, and adjustable means for compressing the compliant member between the first and second members, whereby adjusting the compression changes the mechanical resonance frequency of the transmission.

2. A one-way transmission comprising the elements of claim 1 wherein the first member, second member and compliant member are annular in shape, and the means for compressing the compliant member between the first and second members includes a ring mounted coaxially on the periphery of the first member and abutting the surface of the second member opposite the compliant member.

3. A one-way transmission comprising the elements of claim 1 wherein the first member, second member and compliant member are annular in shape, the first member having a plurality of parallel spaced grooves on one surface thereof, and the second member having a plurality of parallel spaced grooves on the surface thereof confronting the grooved surface of the first member, the compliant member being provided with a plurality of spaced ridges on one surface thereof disposed within the grooves of the first member and a plurality of parallel spaced ridges on the other surface thereof disposed within the grooves of the second member.

4. A one-way transmission comprising the elements of claim 3 in combination with a hollow cylindrical spacer disposed about the compliant member and mounted on the periphery of the second member, and an annular ring having a cylindrical flange extending from the periphery thereof disposed coaxially about the second and compliant members, the flange being mounted on the periphery of the first member and the ring confronting the surface of the second member opposite the compliant member, and a bushing disposed in abutment between the ring and second member, said ring compressing the compliant member to the thickness of the spacer.

5. A one-way transmission comprising the elements of claim 3 in combination with a sleeve having a set of outwardly extending gear teeth parallel to the axis thereof, a hollow cylindrical element disposed coaxially about the sleeve and mounted to one of the elements of the coupler, said element having a second set of gear teeth extending inwardly therefrom and meshed with the teeth of the first set, the teeth of at least one of said sets having edges curving away from the other set.

6. A one-way transmission comprising the element of claim 1 wherein the cylindrical inner race is provided with a plurality of spaced indentations, each indentation having a flat surface extending from the surface of the inner race parallel to the axis of the inner race, each of said flat surfaces being at approximately the same angle relative to the radial plane passing through the line of intersection of the flat surface and the outer surface of the inner race, and each of the drive elements comprises a cylindrical roller, in combination with means to bias each roller bearing toward the intersection of the confronting flat surface and outer surface of the inner race.

7. A one-way transmission comprising the elements of claim 6 wherein the inner race has a cylindrical axial channel therein in combination with a cylindrical sleeve having a set of outwardly extending teeth parallel to the axis thereof disposed coaxially within the channel of the inner race, said inner race having a second set of inwardly extending teeth on the surface of the channel thereof meshed with the teeth of the sleeve, the teeth of at least one of said sets having edges curving away from the other set.

8. A one-way transmission comprising the elements of claim 1 wherein the first member and second member of the coupler are provided with a plurality of spaced radial ridges and the compliant member is provided with a groove confronting each ridge of the first and second members.

9. A one-way transmission comprising the elements of claim 8 in combination with a hollow cylindrical spacer disposed about the compliant member and mounted on the periphery of the second member, and an annular ring having a cylindrical flange extending from the periphery thereof disposed coaxially about the second and compliant members, the flange being mounted on the periphery of the first member and the ring confronting the surface of the second member opposite the compliant member, and a bushing disposed in abutment between the ring and second member, said ring compressing the compliant member to the thickness of the spacer.

10. A one-way transmission comprising the elements of claim 1 in combination with a hollow cylindrical spacer disposed about the compliant member, and an annular ring having a cylindrical flange extending from the periphery thereof disposed coaxially about the second and compliant members, the flange being mounted on the periphery of the first member and the ring confronting the surface of the second member opposite the compliant member, said ring compressing the compliant member to the thickness of the spacer.

References Cited in the file of this patent

UNITED STATES PATENTS

| | | |
|---|---|---|
| 1,694,064 | Jeneick | Dec. 4, 1928 |
| 2,028,500 | Cook et al. | Jan. 21, 1936 |
| 2,082,842 | Marland | June 8, 1937 |
| 2,371,653 | Schuckers | Mar. 20, 1945 |
| 2,449,654 | Jessop | Sept. 21, 1948 |
| 2,555,909 | Wellauer | June 5, 1951 |
| 2,623,618 | Howard | Dec. 30, 1952 |
| 2,738,970 | Granet et al. | Mar. 20, 1956 |
| 2,742,769 | Gleeson et al. | Apr. 24, 1956 |
| 2,873,010 | Alma | Feb. 10, 1959 |

UNITED STATES PATENT OFFICE
CERTIFICATE OF CORRECTION

Patent No. 3,058,556            October 16, 1962

Joseph A. Marland

It is hereby certified that error appears in the above numbered patent requiring correction and that the said Letters Patent should read as corrected below.

Column 6, line 44, for "coupled" read -- coupler --.

Signed and sealed this 30th day of July 1963.

(SEAL)
Attest:

ERNEST W. SWIDER
Attesting Officer

DAVID L. LADD
Commissioner of Patents